(12) United States Patent
Snook et al.

(10) Patent No.: US 6,608,937 B1
(45) Date of Patent: Aug. 19, 2003

(54) LOW BIT RATE VIDEO CODING METHOD AND SYSTEM

(75) Inventors: Daniel Snook, Palaiseau (FR); Jean Gobert, Maisons-Alfort (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/558,775

(22) Filed: Apr. 26, 2000

(30) Foreign Application Priority Data

Apr. 30, 1999  (EP) .............................................. 99401067

(51) Int. Cl.⁷ ................................................. G06K 9/36
(52) U.S. Cl. ........................................ 382/236; 382/238
(58) Field of Search ................................ 382/236, 238; 375/240.16, 240.15; 348/699

(56) References Cited

FOREIGN PATENT DOCUMENTS

| EP | 0577365 A2 | 1/1994 | .......... H04N/7/133 |
| EP | 0782343 A2 | 7/1997 | ............ H04N/7/50 |
| WO | WO9907159 | 2/1999 | ............ H04N/7/50 |

OTHER PUBLICATIONS

International Telecommunication Union, ITU–T Telecommunication Standardization Sector of ITU, Draft H.263, Jan. 27, 1998, "Video Coding for Low Bit Rate Communication, Transmission of Non–Telephone Signals", pp 1–14.

*Primary Examiner*—Anh Hong Do
(74) *Attorney, Agent, or Firm*—Russell Gross

(57) ABSTRACT

In the Improved PB-frames mode, one of the options of the H.263+ Recommendation, a macroblock of a B-frame may be encoded according to a forward, a backward or a bidirectional prediction mode. The invention relates to a method of encoding a sequence of pictures defining a strategy for the choice of a prediction mode among the three possible ones in the encoding of B-macroblock. This strategy is based upon SAD(Sum of Absolute Difference) calculations and motion vectors coherence and allows to use backward prediction when scene cuts occur. In the proposed strategy, the SAD of the bidirectional prediction is not necessarily derived when the motion is non linear allowing less calculation and reduction in CPU burden. The invention also relates to an encoding system for carrying out said method and including a computer-readable medium storing instructions that allow the implementation of this method.

2 Claims, 3 Drawing Sheets

| | MV2 | MV3 |
|---|---|---|
| MV1 | MV | |

LOW BIT RATE VIDEO CODING METHOD AND SYSTEM

FIELD OF THE INVENTION

The invention relates to a method of encoding a source sequence of pictures comprising the steps of:
  dividing the source sequence into a set of groups of pictures, each group of pictures comprising a first frame, hereafter referred to as I-frame, followed by at least a pair of frames, hereafter referred to as PB-frames;
  dividing each I-frame and PB-frame into spatially non-overlapping blocks of pixels;
  encoding the blocks of said I-frame, hereafter referred to as the I-blocks, independently from any other frame in the group of pictures;
  deriving motion vectors and corresponding predictors for the blocks from the temporally second frame of said PB-frame, hereafter referred to as the P-blocks, based on the I-blocks in the previous I-frame or the P-blocks in the previous PB-frame;
  predictively encoding the P-blocks based on the I-blocks in the previous I-frame or the P-blocks in the previous PB-frame;
  predictively encoding the blocks of the first frame of said PB-frame, hereafter referred to as the B-blocks.

The invention also relates to a system for carrying out said method.

The invention may be used, for example, in video coding at a very low bit rate.

BACKGROUND ART

Standardization of low bitrate video telephony products and technology by the ITU (International Telecommunication Union) are compiled in the standards H.320 and H.324. These standards describe all the requirements to be satisfied for the different components audio, video, multiplexer, control protocol and modem. H.320 is dedicated to videoconferencing or videophony over ISDN (Integrated Services Digital Network) phone lines. H.324 is aimed at videophony over GSTN (Global Switch Telephonic Network) analog phone lines. The two standards both support Recommendation H.263 for video-coding, which describes compression of low bit rate video signals. Recommendation H.263 comprises four optional modes for a video coder. One of these optional modes is called the PB-frames mode, which gives a way of encoding a PB-frame. A second version of Recommendation H.263, called H.263+, was developed to improve the image quality and comprises some new options. Thus, an option called Improved PB-frames mode, which is an improvement of the original PB-frames mode, provides a new way of encoding a PB-frame.

A sequence of picture frames may be composed of a series of I-frames and PB-frames. An I-frame comprises a picture coded according to an Intra mode, which means that an I-frame is coded using spatial redundancy within the picture without any reference to another picture. A P-frame is predictively encoded from a previous P or I-picture. Thus, when coding a P-picture, temporal redundancy between the P-picture and a previous picture used as a picture reference, which is mostly the previous I or P-picture, is used in addition to the spatial redundancy as for an I-picture. A B-picture has two temporal references and is usually predictively encoded from the previous reconstructed P or I-picture and the P-picture currently being reconstructed. A PB-frame comprises two successive pictures, a first B-frame and a subsequent P-frame, coded as one unit.

A method of coding a PB-frame in accordance with the PB-frame mode is illustrated in FIG. 1. It shows a PB-frame composed of a B-frame B and a P-frame P2. The B-frame B is surrounded by a previous P-picture P1 and the P-picture. P2 currently being reconstructed. There is shown in this example a P-picture P1; P1 may also be a I-picture and serves as a picture reference for the encoding of the P-picture P2 and the B-picture B. A B-block of the B-frame, in the PB-frame mode, can be subjected to forward or bidirectional predictive encoding. The fact that a B-block is subjected to forward predictive coding is based on the previous I or P-picture P1 and the fact that a B-block is subjected to bidirectional predictive coding is based on both the previous I or P-picture P1 and the P-picture P2 currently being reconstructed. A set of motion vectors MV is derived for the P-picture P2 of the PB-frame with reference to the picture P1. In fact for each macro block of P2, a macro block of P1 is associated by block matching and a corresponding motion vector MV is derived. Motion vectors for the B-block are derived from the set of motion vectors previously derived for P1. Therefore, a forward motion vector MVf and a backward motion vector MVb are calculated for a B-block as follows:

$$MVf=(TRb \times MV)/TRd \qquad (1)$$

$$MVb=((TRb-TRd) \times MV)/TRd \qquad (2)$$

$$MVb=MVf-MV \qquad (3)$$

where
  TRb is the increment in the temporal reference of the B-picture from the previous P-frame P1, and
  TRd is the increment in the temporal reference of the current P-frame P2 from the previous I or P-picture P1.

FIG. 1 shows a macro block AB of the B-picture. This macro block AB has the same location as a macro block $A_2B_2$, Prec, of P2 that was previously reconstructed. A forward motion vector MV is associated to the macro block $A_2B_2$ from a macro block $A_1B_1$, which belongs to P1. A forward motion vector MVf and a backward motion vector MVb, both associated to AB are derived from MV as shown in the relations (1) to (3). The macro blocks of P1 and P2 associated to the macro block AB by the forward vector MVf and by the backward vector MVb are respectively $K_1M_1$ and $K_2M_2$, as illustrated in FIG. 1.

The choice between bidirectional prediction and forward prediction is made at the block level in the B-picture and depends on where MVb points. Then a MB part of the B-block AB, for which MVb points inside Prec, is bidirectionally predicted, and the prediction for this part of the B-block is:

$$MB(i,j)=[A_1M_1(i,j)+A_2M_2(i,j)]/2 \qquad (4)$$

where i and j are the spatial coordinates of the pixels.

An AM part of the B-block AB, for which MVb points outside Prec, is forward-predicted and the prediction for this part of the B-block AB is:

$$AM(i,j)=K_1A_1(i,j) \qquad (5)$$

An improved method of encoding a PB-frame according to the PB-frame mode is described in European Patent Application EP 0 782 343 A2. It discloses a predictive method of coding the blocks in the bidirectionally predicted frame, which method introduces a delta motion vector added to or subtracted from the derived forward and backward motion vectors respectively. The described method may be relevant when the motion in a sequence of pictures is non-linear, however, it is totally unsuitable for a sequence of pictures where scene-cuts occur. Indeed, when there is a scene cut between a previous P-frame and the B-part of a PB-frame, bidirectional and forward prediction give an erroneous coding. Besides, the implementation of the delta vector, which is costly in terms of CPU burden, may result in unnecessary, expensive and complicated calculations.

SUMMARY OF THE INVENTION

It is an object of the invention to improve the efficiency of existing coding methods, while decreasing CPU burden, and, more particularly, to provide an efficient strategy or method which permits to make the most suitable choice among prediction modes for the coding of a given macro block of a B-frame.

Thus, the encoding of the B-blocks comprises for each B-block in series the steps of:
  deriving the minimum of the sum of absolute difference for the B-block based on the I-blocks in the previous I-frame or on the P-blocks in the previous PB-frame, hereafter referred to as SADf;
  deriving the sum of absolute difference for the B-block and the P-block in the P-frame of the PB-frame with the same location as the B-block, hereafter referred to as
  when SADf is greater than SADb, predictively encoding the B-block based on the P-blocks of the second frame of the PB-frame;
  when SADf is lower than SADb:
    deriving, for the P-block with the same location as the B-block, the difference between said motion vector and said predictor;
    when the difference obtained is greater than a predetermined threshold, predictively encoding the B-block based on the I-blocks or the P-blocks in the previous PB-frame;
    when the difference obtained is smaller than the predetermined threshold, predictively encoding the B-block based on the P-blocks of the second frame of the PB-frame and the I-blocks or the P-blocks in the previous PB-frame.

For the coding of a B-block, the method claimed gives a strategy for the choice of the prediction mode to be used among the forward, backward and bidirectional modes. The choice is based on SAD (Sum of Absolute Difference) calculation and motion vector coherence. The strategy is based on a specific order in the comparisons of the SAD values for the three prediction modes and the introduction of motion coherence. This motion vector coherence criterion permits to avoid the calculation of SADbidirectional for the choice of bidirectional prediction, which is CPU-consuming. The proposed method has the main advantage of not being in favor of bidirectional prediction and allows to perform backward prediction when there is no motion. Thus, the method leads to a suitable choice of prediction mode for a given block of a B-frame.

In a preferred embodiment of the invention, a method according to the invention may either be carried out by a system constituted by wired electronic circuits that may perform the various steps of the proposed method. This method may also be partly performed by means of a set of instructions stored in a computer-readable medium.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

A misuse of the word "block" may occur in the following paragraphs. When reading block one must understand macro block, as defined in ITU standards.

Figure 1:
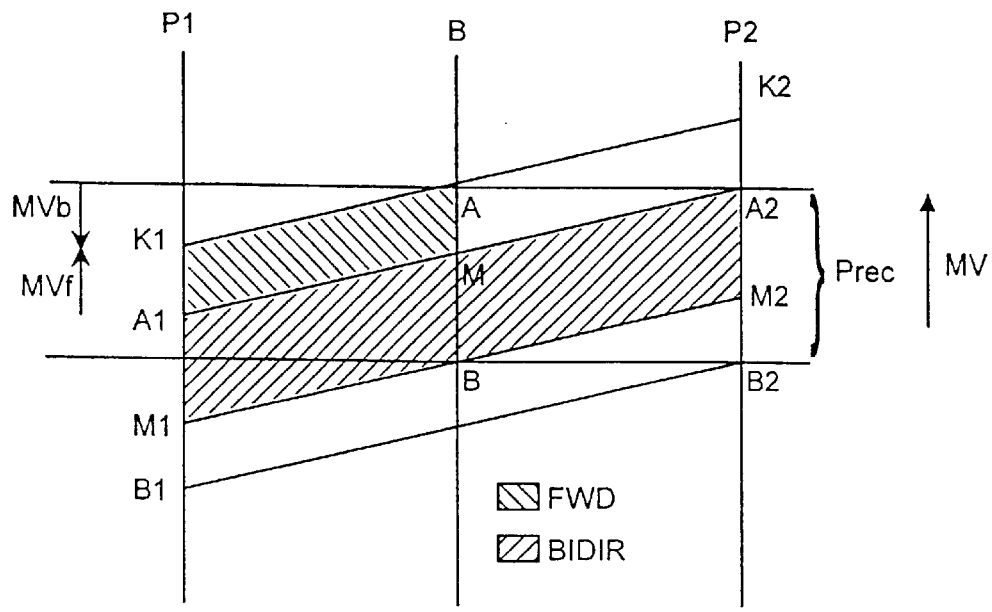
FIG. 1 illustrates a prior art decoding method according to the PB-frame mode.
Figure 2:
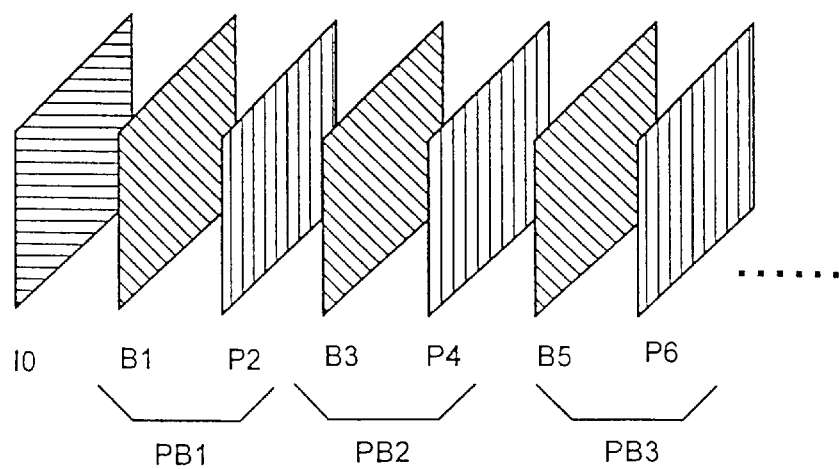
FIG. 2 shows a sequence of pictures for encoding.

FIG. 2 depicts a source sequence of picture frames that has to be encoded following a method in accordance with the invention. This shown sequence is organized in a first I-frame Io temporally followed by a series of PB-frames. Each PB-frame PB1, PB2, PB3 is constituted by a first frame, say, a B-frame and a second frame, say a P-frame. Thus, PB1 comprises a B-frame B 1 and a subsequent P-frame P2, PB2 comprises a B-frame B3 and a subsequent P-frame P4, PB3 comprises a B-frame B5 and a subsequent P-frame P6 . . .

The various frames will be encoded in the order given hereinafter. Io is first encoded according to an Intra mode, i.e. without reference to any other picture. P2 is, then, predictively encoded with reference to Io and, subsequently, B1 is encoded with reference to Io and P1, which is, inside the encoder, internally reconstructed. P4 is then encoded with reference to P2 and, subsequently, B3 is encoded with reference to P2 and P4, which is internally reconstructed too. Thus, each P-block of a PB-frame in the sequence is transmitted and encoded before the B-block of the PB-frame, and with reference to the previous I or P-picture. Each B-picture is encoded after the corresponding P-picture of the PB-frame and with reference to said corresponding P-picture of the PB-frame and to the previous encoded I or P-picture.

The sequence of pictures proposed in FIG. 2 is by no means a limitation of the sort of sequences of pictures, that may be encoded following a method in accordance with the invention. In fact, the sequence may also comprise two or more successive B-frames between two P-frames. In such case the B-frames are encoded in the same order as they are transmitted with reference to the previous I or P-frame and the next P-frame, which was previously encoded and which is currently reconstructed.

Figures 3, 4:
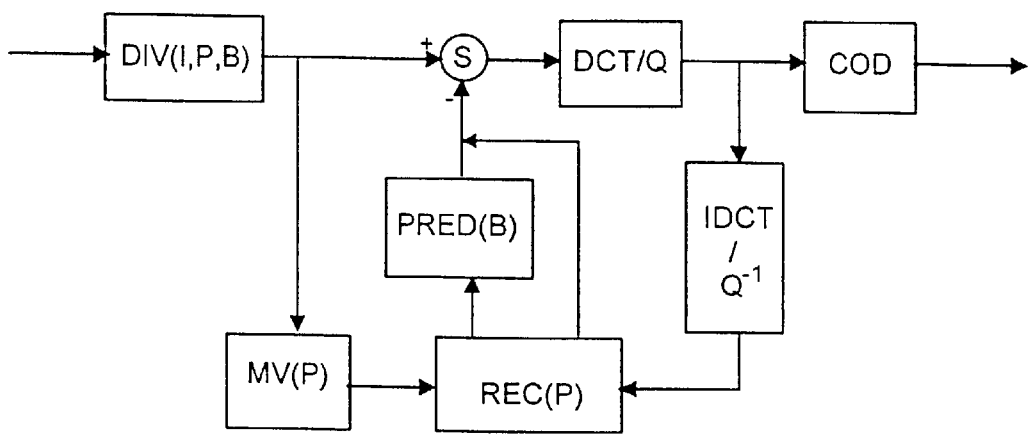
FIG. 3 is a block diagram of the various steps of a coding system.
FIG. 4 allows to understand how the predictor of a motion vector is defined.

A sequence of pictures, such as the one described in FIG. 2, is passed picture-by-picture through the various coding steps of the system in FIG. 3, said system being provided for carrying out a method in accordance with the invention. First a circuit DIV(I,P,B) divides each transmitted frame into spatially non-overlapping N×M, say 16×16, macro blocks of pixels for encoding convenience. I, P and B frames are not encoded in the same way, so, they do not follow the same path through the system. Each sort of frame follows an adapted path.

An I-frame, whose encoding does not require reference to any other picture, is passed directly from the circuit DIV(I, P,B) to a circuit DCT/Q. This circuit DCT/Q transforms a frame received in the spatial domain into a frame in the frequency domain. It applies a discrete cosine transform to the picture divided into blocks of pixels, resulting in a set of transform coefficients, which are then quantized. These quantized coefficients, coming from the DCT/Q circuit are then passed to a circuit COD for further encoding and at the same time to a circuit IDCT/Q$^{-1}$. The circuit IDCT/Q$^{-1}$ dequantizes and transforms the coefficients by inverse discrete cosine transform, back to the spatial domain. A circuit REC(P) reconstructs each block of the I-frame and then the I-picture is stored in a memory part of a circuit MV(P).

A P-frame, after being divided into blocks of pixels by DIV(I,P,B), is transmitted to the motion estimator MV(P). MV(P) is stored in the memory part with the previously transmitted I or P-picture already stored in the memory. A motion vector MV is derived for each block of the P-picture, hereafter referred to as P-block, with reference to the picture currently stored. This vector MV may possibly be derived by minimizing a function SAD (Sum of Absolute Difference), which is given hereinbelow:

$$SAD = \sum_{m=1}^{16}\sum_{n=1}^{16} |B_{i,j}(m,n) - B_{i-u,j-v}(m,n)|$$

where $B_{i,j}(m,n)$ represents the $(m,n)^{th}$ pixel of the 16×16 P-block at the spatial location (i,j) and $B_{i-u,j-v}(m,n)$ represents the $(m,n)^{th}$ pixel of a candidate macro block in the previous I or P-picture at the spatial location (i,j) displaced by the vector (u,v). The motion vector is the displacement between the P-block and the candidate macro block giving the smallest SAD. Simultaneously, in the circuit MV(P), an associated predictor MVpred is derived for each motion vector MV. A possible way of deriving MVpred is given by Recommendation H.263 as illustrated in FIG. 4, which depicts a P-block and its adjacent neighbouring blocks. MVpred is defined as the median value of MV1, MV2, MV3, where MV1 is the motion vector associated to the previous macro block, MV2 is the motion vector of the above macro block and MV3 is the motion vector of the above right macro block. The difference between this motion-compensated P-frame and the previous I or P-frame stored in the memory part of MV(P) is performed in the tap adder S and transmitted to the unit DCT/Q resulting in a quantized transformed frame. This one is then passed to the unit COD for further encoding and, at the same time, to the units IDCT/Q−1 and REC(P). Here, REC(P) reconstructs each block of the P-frame from the association of the differential frame received from the circuit IDCT/Q$^{-1}$, the motion vectors received from the motion estimator MV(P) and the previously I or P-frame stored in the memory part of MV(P). After being reconstructed, the memory part of MV(P) is updated with the current P-frame.

Figure 5:
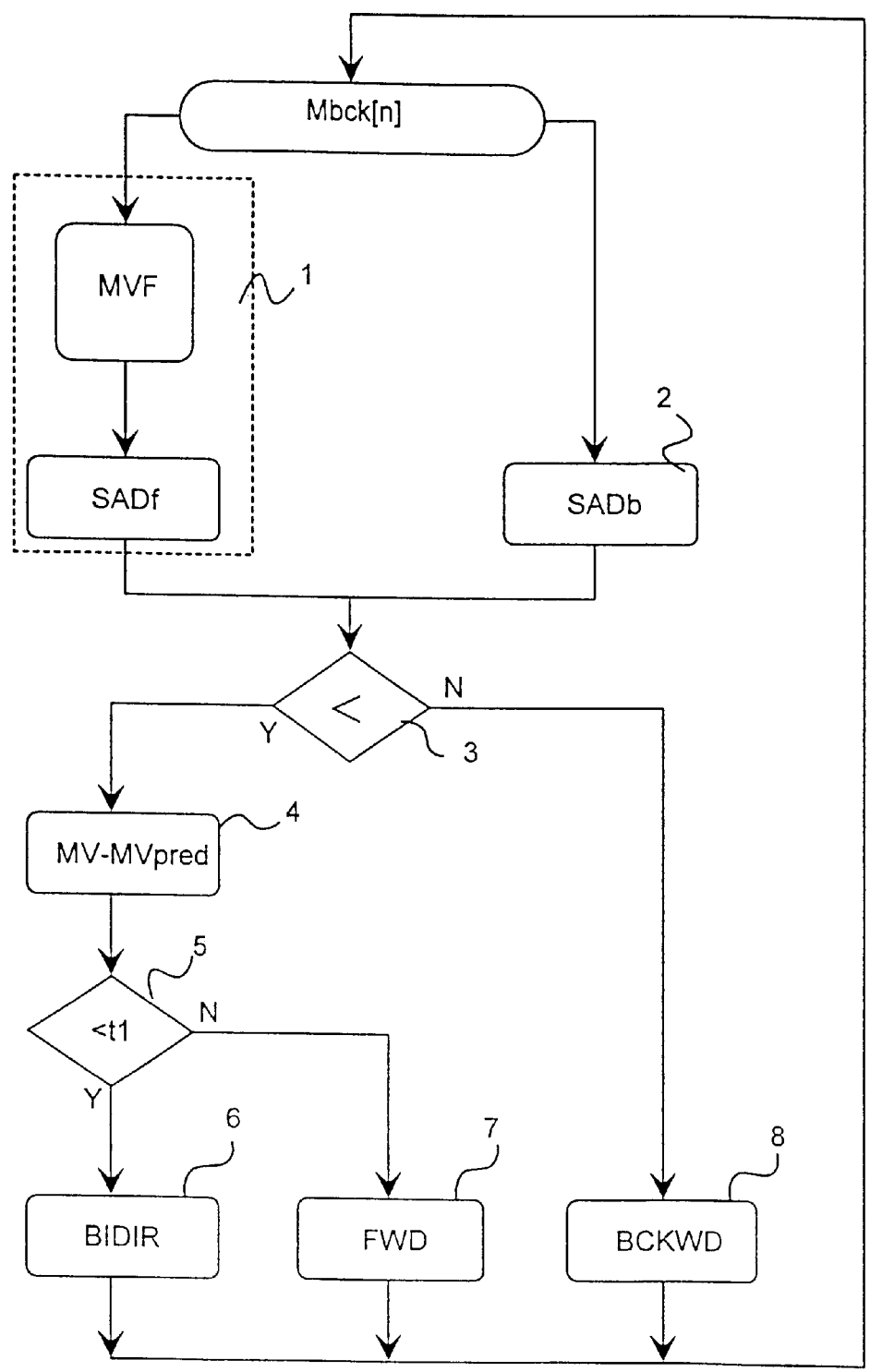
FIG. 5 is a block diagram of the various steps in the encoding of a B-block leading to the choice of a prediction mode in accordance with the invention.

A B-frame is passed directly to a predictor PRED(B) for being predictively encoded according to a forward, backward or bidirectional prediction mode. When encoded, a motion-compensated block of this frame is subtracted in S from the initial reference block, the difference being passed through DCT/Q and then to COD for further encoding. A choice has to be made from the three possible prediction modes. When needed for making this choice, PRED(B) receives from REC(P) data concerning the associated P-frame of the PB-frame, which is the previous P-frame reconstructed and the previous I or P-frame, both pictures being stored in the memory part of MV(P). A strategy in accordance with the invention leading to such the choice of the prediction mode for a B-block is depicted in the diagram of FIG. 5.

For each macro block Mbck[n] of a B-frame transmitted to PRED(B) a forward motion estimation MVf is performed in a step 1. It comprises deriving a forward motion vector MVf by minimizing the SAD function for the B-block with reference to the previous I or P-picture. This minimum is referred to as SADf. In a step 2, SADb is derived as the sum of absolute difference between the B-block and the macro block with the same location in the P-frame of the PB-frame.

A comparison between SADf and SADb in a step 3 leads to two cases. First, when the value of SADf is greater than the value of SADb, the backward prediction mode is chosen and performed in a step 8. The B-block is, in this case, predictively encoded with reference to the corresponding P-frame of the PB-frame.

Otherwise, when SADf is smaller than SADb, a motion estimation coherence test is performed. The motion vector MV and its predictor MVpred, which are associated to the P-block with the same location as the B-block in the P-frame of the PB-frame, and which were calculated in MV(P) as shown in FIG. 3, are compared in steps 4 and 5. When the difference MV-MVpred is lower than a predefined threshold t1, bidirectional prediction is chosen and performed in a step 6. The B-block is, in this case, predictively encoded from the previous I or P-picture and the P-picture of the PB-frame currently decoded. When the difference is greater than t1, the forward prediction is chosen and performed in a step 7. The B-block is, in this case, predictively encoded with reference to the previous I or P-picture.

Once the macro block Mbck[n] is predictively encoded according to the selected prediction mode, a new block Mbck[n] is provided, a suitable prediction mode is selected, and the new block is, in turn, encoded, until the B-picture is completely encoded, block-by-block.

It is to be noted that, with respect to the described coding method and system, modifications or improvements may be proposed without departing from the scope of the invention. For instance, it is clear that this coding method can be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits. The invention then also relates to a computer-readable medium comprising a software module that includes computer-executable instructions for performing the steps, or some steps, of the method described hereinabove. In such a case, these instructions are incorporated in a computer program that can be loaded and stored in said medium and causes any encoding systems such as described above and including said medium to be able to carry out the described encoding method by means of an implementation of the same functions as those fulfilled by the replaced circuits.

What is claimed is:

1. A method of encoding a source sequence of pictures comprising the steps of:

dividing the source sequence into a set of groups of pictures, each group of pictures comprising a first frame, hereafter referred to as I-frame, followed by at least a pair of frames, hereafter referred to as PB-frames;

dividing each I-frame and PB-frame into spatially non-overlapping blocks of pixels;

encoding the blocks of said I-frame, hereafter referred to as the I-blocks, independently from any other frame in the group of pictures;

deriving motion vectors and corresponding predictors for the blocks from a temporally second frame of said PB-frames, hereafter referred to as the P-blocks, based on the I-blocks in the previous I-frame or the P-blocks in a previous PB-frame;

predictively encoding the P-blocks based on the I-blocks in the previous I-frame or the P-blocks in the previous PB-frame;

predictively encoding the blocks of the first frame of said PB-frame, hereafter referred to as the B-blocks, wherein the encoding of the B-blocks.comprises for each B-block in series the steps of:

deriving the minimum of the sum of absolute difference for the B-block based on the I-blocks in the previous I-frame or on the P-blocks in the previous PB-frame, hereafter referred to as SADf;

deriving the sum of absolute difference for the B-block and the P-block in the P-frame of the PB-frame with the same location as the B-block, hereafter referred to as SADb;

when SADf is greater than SADb, predictively encoding the B-block based on the P-blocks of the temporally second frame of the PB-frames;

when SADf is lower than SADb:

deriving, for the P-block with the same location as the B-block, the difference between said motion vector and said corresponding predictors;

when the difference obtained is greater than a predetermined threshold, predictively encoding the B-block based on the I-blocks or the P-blocks in the previous PB-frame;

when the difference obtained is smaller than the predetermined threshold, predictively encoding the B-block based on the P-blocks of the second frame of the PB-frame and the I-blocks or the P-blocks in the previous PB-frame.

2. A system for encoding a sequence of pictures comprising:

means for dividing the source sequence into a set of groups of pictures, each group of pictures comprising a first frame, hereafter referred to as I-frame, followed by at least a pair of predictively encoded frames, hereafter referred to as PB-frames;

means for dividing each I-frame or PB-frame into spatially non-overlapping blocks of pixels;

a motion estimator for deriving motion vectors and corresponding predictors for the blocks from a temporally second frame of said PB-frames, hereafter referred to as the P-blocks, based on the I-blocks in the previous I-frame or the P-blocks in a previous PB-frame;

means for encoding the blocks of said I-frame, hereafter referred to as the I-blocks, independently from any other frame in the group of pictures, for predictively encoding the P-blocks based on the I-blocks in the previous I-frame or the P-blocks in the previous PB-frame and for predictively encoding the blocks from the first frame of said PB-frame, hereafter referred to as the B-blocks, wherein the means for the encoding of the B-blocks includes:

means for deriving the minimum of the sum of absolute difference for the B-block based on the I-blocks in the previous I-frame or on the P-blocks in the previous PB-frame, hereafter referred to as SADf;

means for deriving the sum of absolute difference for the B-block and the P-block with the same location as the B-block, hereafter referred to as SADb;

means for when SADf is greater than SADb, predictively encoding the B-block based on the P-blocks of the second frame of the PB-frame;

means for when SADf is lower than SADb:

deriving, for the P-block with the same location as the B-block, the difference between said motion vector and said corresponding predictors;

when the difference obtained is greater than a predetermined threshold, predictively encoding the B-block based on the I-blocks or the P-blocks in the previous PB-frame;

when the difference obtained is smaller than the predetermined threshold, predictively encoding the B-block based on the P-blocks of the second frame of the PB-frame and the I-blocks or the P-blocks in the previous PB-frame.

* * * * *